United States Patent [19]
Gericke et al.

[11] Patent Number: 5,149,229
[45] Date of Patent: Sep. 22, 1992

[54] METHOD OF AND APPARATUS FOR PNEUMATICALLY CONVEYING GRANULAR SOLIDS

[75] Inventors: Willi Gericke, Watt, Switzerland; Karl-Ernst Wirth, Happurg; Wolfgang Siebenhaar, Nürnberg, both of Fed. Rep. of Germany

[73] Assignee: Gericke AG, Maschinenfabrik, Regensdorf, Switzerland

[21] Appl. No.: 416,264

[22] Filed: Oct. 3, 1989

[30] Foreign Application Priority Data

Oct. 4, 1988 [EP] European Pat. Off. ........ 88116404.0
Sep. 28, 1989 [EP] European Pat. Off. ........ 89117944.2

[51] Int. Cl.⁵ .............................................. B05B 17/00
[52] U.S. Cl. ...................................................... 406/75
[58] Field of Search .......................... 406/75, 51, 73, 74

[56] References Cited

U.S. PATENT DOCUMENTS 2,900,138 8/1959 Strate ..................................... 406/75
4,540,120 9/1985 Waszkiewicz ........................ 406/75

FOREIGN PATENT DOCUMENTS 895723 7/1949 Fed. Rep. of Germany ........ 506/75
2242855 3/1974 Fed. Rep. of Germany ........ 406/75

Primary Examiner—Jesus D. Sotelo
Assistant Examiner—Stephen P. Avila
Attorney, Agent, or Firm—Henry M. Feiereisen

[57] ABSTRACT

A method and apparatus for pneumatically conveying material in form of granular solids or the like includes a feeder sending the material under pressure and addition of carrier gas in a transport pipe such that its cross sectional area is only partly filled with the material. The transport pipe is subdivided by vibration compensators into several pipe sections of a length of up to several meters which are subjected to vibrations so that the wall friction between the material and the transport pipe is reduced in such a manner that at a flow pattern similar to a strand/crown flow up to a plug flow the carrier gas is charged with material to a high degree and a material layer forming at the pipe bottom is also conveyed. The pipe sections may be made of a rigid vibrating material or may be made in form of a flexible hose which is mounted on a support and either directly or indirectly subjected to vibrations.

33 Claims, 3 Drawing Sheets

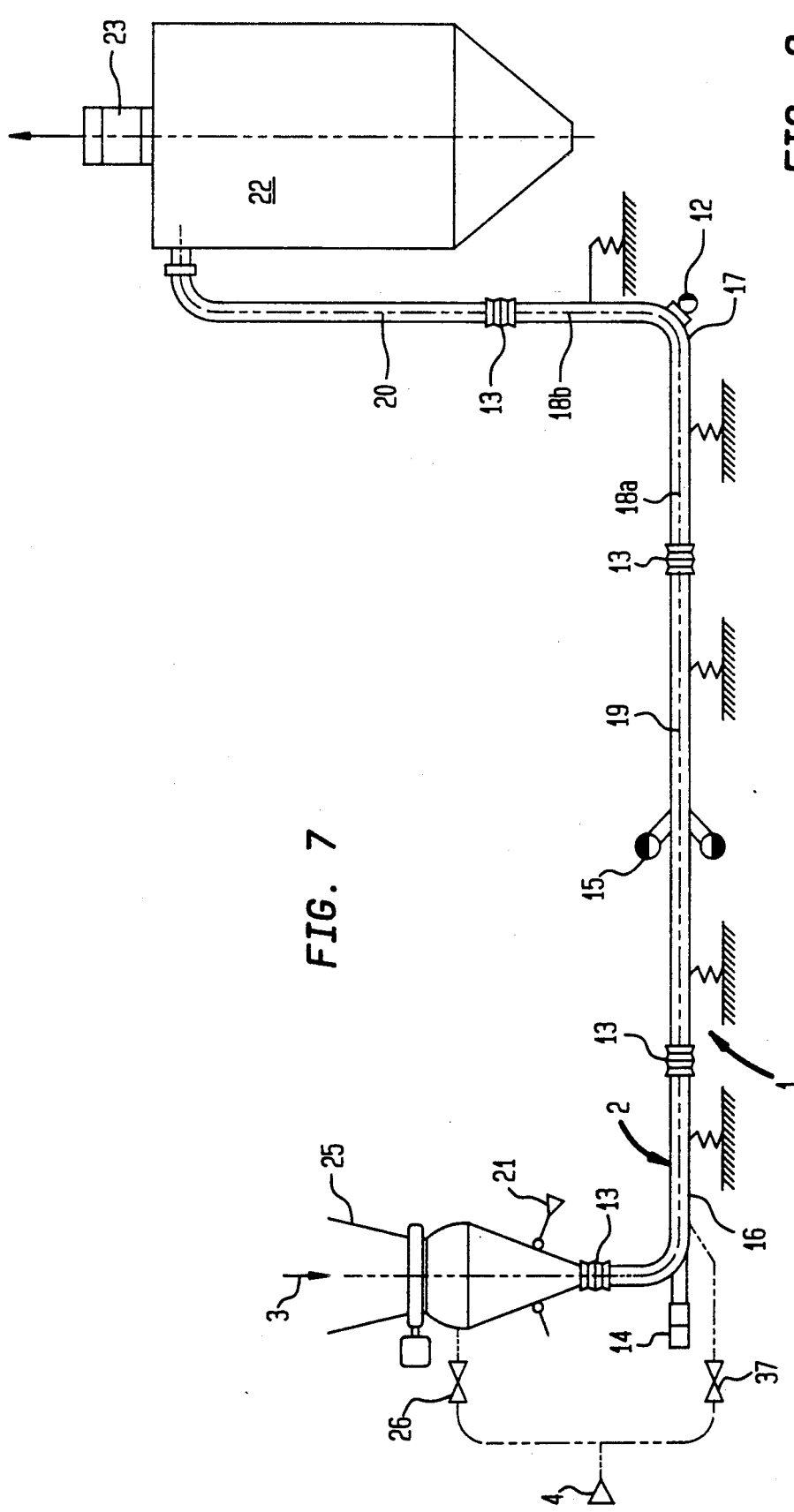
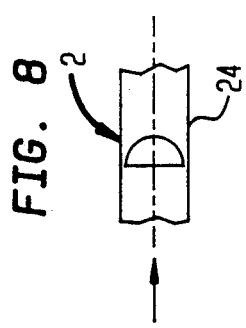
FIG. 7
FIG. 8

METHOD OF AND APPARATUS FOR PNEUMATICALLY CONVEYING GRANULAR SOLIDS

BACKGROUND OF THE INVENTION

The present invention refers to a method of and apparatus for pneumatically conveying bulk material in form of granular solids or the like though a transport pipe.

In general, the material to be conveyed is mixed with carrier gas, in particular compressed air and sent under pressure from a feeder such as a rotary feeder, lock or the like in the transport pipe. Recently, there is a trend to conduct the transport at very low velocities of the material and at increased charge of the carrier gas. A transport of bulk material under such conditions has the advantage that the material and the conveyor are protected against wear and destruction and allows the use of small quantities of carrier gas. This in turn facilitates dedusting and saves energy.

A further decrease of the conveying velocity at increased charge of the carrier gas is, however, only possible up to a certain point because of the increasing pressure drag caused by the friction of the carrier gas and material to be conveyed on the inner pipe wall surface and the resulting clogging and formation of blockages in the transport pipe. In order to remove such clogging or blockages, methods were proposed by which auxiliary air or bypass air was fed into the transport pipe. This, however, rendered the conveyor complicated and inefficient.

German patent DE-PS 32 12 782 discloses a method of pneumatically conveying granular material with a transport pipe which is completely filled with material and which is subjected to vibrations and simultaneously set under pressure. The vibrations are applied in axial direction or in circumferential direction relative to the pipe and result in a frictional reduction between the material and the pipe wall. Although a desired slow transport of the combined carrier gas/material column is attained, the conveying capacity is still too limited as only conveying velocities of up to 20 cm/s can be reached. An increase of the conveying capacity is not feasible as the conveying velocity would become too low. Moreover, the conveyor becomes relative complicated when desiring to deflect the transport pipe in a different direction.

SUMMARY OF THE INVENTION

It is thus an object of the present invention to provide an improved method and apparatus for pneumatically conveying bulk material obviating the afore-stated drawbacks.

This object and others which will become apparent hereinafter, are attained in accordance with the present invention by feeding the material under pressure and addition of a carrier gas in a transport pipe in such a manner that its cross sectional area is not completely filled with material but only partly and by subjecting pipe sections of the transport pipe, which can be of a length of up to several meters, to vibrations for reducing frictional resistance between the material and the transport pipe such that at a flow pattern similar to a strand/crown flow up to a plug flow including a flow in form of a fluidized bed the carrier gas is charged with material to a high degree and a material layer forming at the pipe bottom is also conveyed.

Through the provision of the method according to the invention, the still existing gap is filled between the very slow transport of bulk material in a vibrating transport pipe which is completely filled with bulk material and the so-called strand flow in which the material flows above a static lower material layer in form of strands and crowns, with the carrier gas being charged to such a degree that the pressure drag is still of a magnitude which prevents a clogging of the cross section of the transport pipe. The material layer settling on the pipe bottom during strand/crown flow is advanced forwards under the influence of the vibrations so that the frictional resistance is further reduced and the charge of the carrier gas can considerably be increased without increasing the gas pressure.

Tests of the method according to the invention have shown that a conventional pneumatic high-pressure pushing conveyor can be run at considerably higher charge and lower velocities when subdividing the transport pipe into various pipe sections and subjecting these pipe sections to vibrations. Although the pipe cross section is only partly filled with material, the charging of the carrier gas with material is still comparably higher than at conventional pneumatic pushing conveyance.

By applying vibrations, in particular in critical areas such as for example in or at bends or in the area of the feeder where material is sent in the transport pipe, blockages even at increased charging of the carrier gas are avoided as the wall friction is reduced by the vibrations.

In tests in which e.g. sand was used as material to be conveyed, it was found that the charging of the carrier gas could be more than doubled at same pressure, and conveying velocities of about 50 cm/s were achieved which were heretofore essentially considered impossible to attain. Thus, in comparison to the substantially higher conveying velocities applied so far, the velocities attained by the method according to the present invention ensure a considerable reduction of wear and cost savings. Despite the low conveying velocity, the attained high charging of the carrier gas results in considerable conveying capacities per pipe cross section.

An apparatus for pneumatically conveying material in form of granular solids of the like includes a transport pipe in which material is introduced from a feeder and which is subdivided by vibration compensators into several pipe sections which are subjected to vibrations generated by respective vibrators mounted to each pipe section. The transport pipe may include horizontal and vertical pipe sections and bends with respective straight shanks at each end thereof. In pipe sections containing a bend, the vibration is applied essentially in direction of the mean radius or through circular motion by means of an unbalance motor. Straight pipe sections are suitably subjected to vibrations in axial direction but also to circular vibrations or to vibrations directed slantingly upwards in conveying direction.

By changing the degree of vibration of the vibrators for example through variation of the speed of the unbalance motor by means of frequency converters, the present invention allows variations in the velocity of the material stream which if desired may even be brought to a standstill. This is relevant especially when combining the apparatus according to the invention with a weighing device for feeding the bulk material in controlled doses either in batch operation or continuous operation. In each case, the conveyed material stream is reproducibly adjustable. Thus, by controlling the degree of vibration, the conveyed material stream can be accurately metered while the pressure as well as the charging degree of the carrier gas may remain unchanged although the latter may be varied if desired.

Pipe sections which offer less resistance such as vertical or descending pipe sections or the end of the transport pipe can be of conventional type, and thus need not be subjected to vibrations but may be fixedly supported.

According to a further feature of the present invention, some or all pipe sections of the transport pipe may be rigid, preferably made of metal, with the individual pipe sections being resiliently supported.

Alternatively, some or all pipe sections of the transport pipe may be made in form of a flexible hose vibratably mounted via hose clamps to a support unit which may be of U-shape and suitably supported so as to be able to vibrate. In this embodiment, the vibrator may be connected to the support unit or may be placed directly via a hose clamp on the hose. Such design can be provided for a vertical hose section as well as a horizontal hose section.

The provision of flexible hoses as pipe sections which are directly or indirectly subjected to vibrations is especially advantageous when transporting special material as e.g. extremely fine grained goods such as beaded black, titanium dioxide and the like. During transport of such goods, the formation of layers at the inner wall surface is completely eliminated because the loosely fastened flexible hose is continuously in motion. This allows a general improvement of the transport and of the cleaning effect.

It is also possible to provide pipe sections as rigid pipes in which a flexible hose is inserted, with the rigid pipe subjected to vibrations.

BRIEF DESCRIPTION OF THE DRAWING

The above and other objects, features and advantages of the present invention will now be described in more detail with reference to the accompanying drawing in which:

FIG. 7 is a schematic illustration of one embodiment of a conveying apparatus in accordance with the present invention;

FIG. 8 is a schematic illustration of a constricting element located in a pipe section;

DETAILED DESCRIPTION OF PREFERRED EMBODIMENTS

Figure 1:
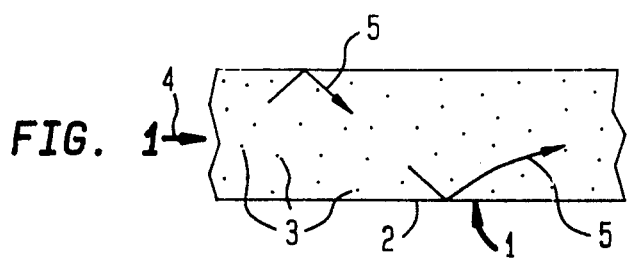
FIGS. 1 and 1a schematically show flow pattern during pneumatic transport in which the material freely floats, with FIG. 1 being a longitudinal sectional view and FIG. 1a being a cross sectional view of a pipe section.
Figure 1A:
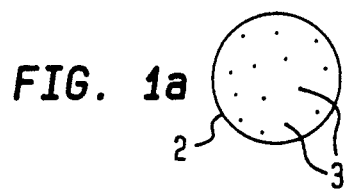

Referring now to the drawing, and in particular to FIGS. 1 to 6, there are shown various flow pattern illustrations during pneumatic conveyance which may be encountered in a pneumatic conveyor in dependance on applied factors such as characteristics of the material to be conveyed, the desired conveying capacity and length of the conveying distance. The conveyor includes a transport pipe generally designated by reference numeral 1 and—as will be described furtherbelow—subdivided into various pipe sections 2. FIGS. 1 and 1a show the material or particles 3 freely floating in the pipe section 2 and suspended in a gas stream which is indicated by arrow 4 and by which the particles 3 are advanced. During their flow through the pipe sections 2, the particles 3 impact the internal wall surface of the pipe section 2 to cause the wall friction as indicated by arrows 5.

Figure 2:
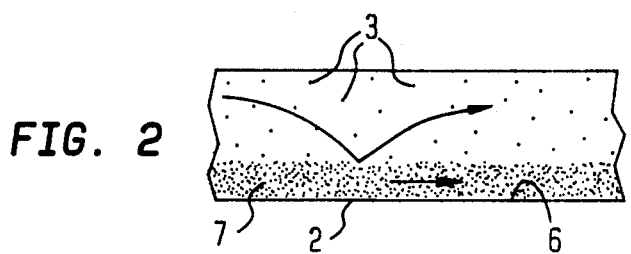
FIGS. 2 and 2a schematically show flow pattern during pneumatic transport in which the material forms strands, with FIG. 2 being a longitudinal sectional view and FIG. 2a being a cross sectional view of a pipe section.
Figure 2A:
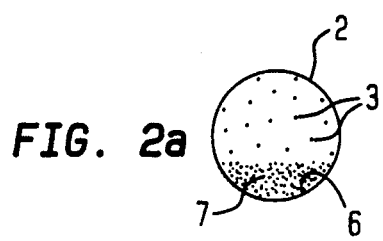

FIGS. 2 and 2a show a flow pattern similar to FIGS. 1 and 1a, with the difference residing in the settling of a material layer 7 on the pipe bottom 6 of the pipe section 2. The material layer 7 is defined in form of strands and represents a basically static mass. As will be described furtherbelow, by applying the method according to the present invention, the material layer 7 is, however, also sufficiently advanced along the pipe bottom 6 as indicated by the arrow in order to prevent material accumulation which may block the transport pipe 1.

Figure 3:
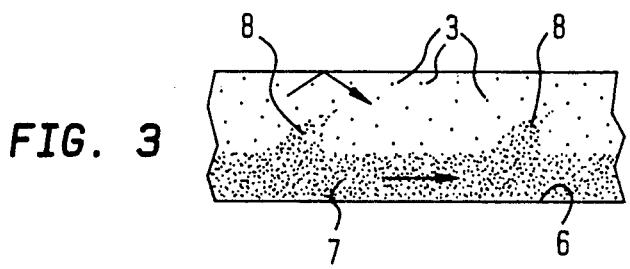
FIGS. 3 and 3a schematically show flow pattern during pneumatic transport in which the material forms strands and dunes, with FIG. 3 being a longitudinal sectional view and FIG. 3a being a cross sectional view of a pipe section.
Figure 3A:
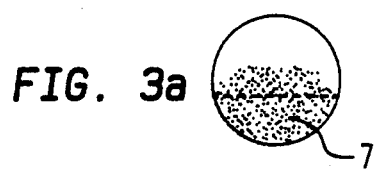
Figure 4:
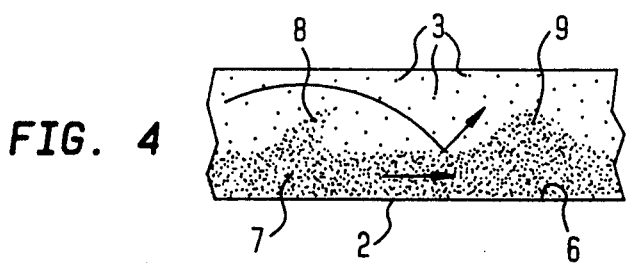
FIGS. 4 and 4a schematically show flow pattern during pneumatic transport in which the material forms dunes and crowns, with FIG. 4 being a longitudinal sectional view and FIG. 4a being a cross sectional view of a pipe section.
Figure 4A:
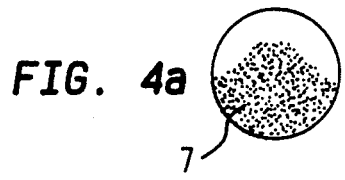

A modification of the flow pattern as shown in FIG. 2 is illustrated in FIGS. 3 and 3a in which the material layer 7 as formed along the pipe bottom 6 includes not only strands but also dunes 8 which are shaped at the surface of the material layer 7 facing the freely floating particles 3 and are successively formed in direction of the pipe axis. Instead of the formation of dunes 8, the material layer 7 may also include crowns 9 or a combination of dunes 8 and crowns 9 as shown in FIGS. 4 and 4b.

Figure 5:
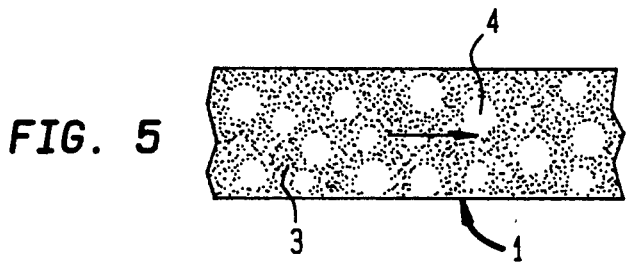
FIGS. 5 and 5a schematically show flow pattern during pneumatic transport in which the material forms a fluidized bed, with FIG. 5 being a longitudinal sectional view and FIG. 5a being a cross sectional view of a pipe section.
Figure 5A:
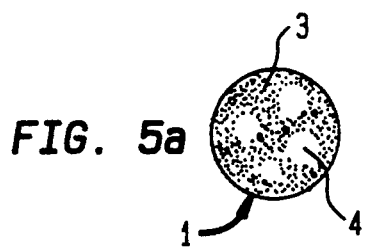
Figure 6:
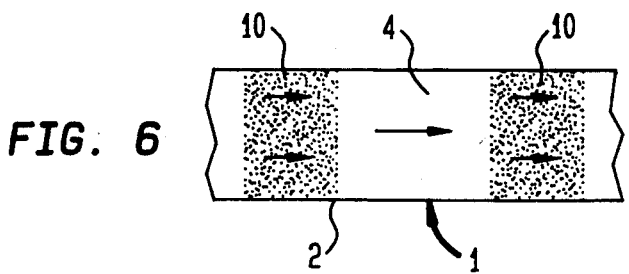
FIGS. 6 and 6a schematically show flow pattern during pneumatic transport in which the material forms plugs, with FIG. 6 being a longitudinal sectional view and FIG. 6a being a cross sectional view of a pipe section.
Figure 6A:
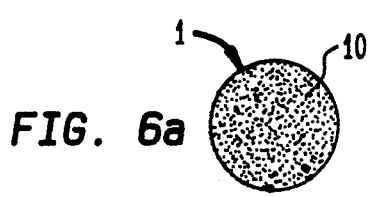

FIGS. 5 and 5a show a flow pattern in which the transport pipe 1 is completely filled with a mixture of carrier gas and particles 3 in form of a fluidized bed, with the fluidization being of such degree that the desired transport is still attained. A modification thereof is shown in FIGS. 6 and 6a in which the particles 3 form separate and spaced plugs 10 in the respective pipe section 2, with carrier gas bubbles extending between the individual plugs 10. The formation of such plugs 10 and thus the flow pattern of induced plug flow can be obtained by intermittently feeding the carrier gas 4.

As will be described hereinafter, the method according to the present invention attains a transport of material similar to a strand/crown flow up to a plug flow as shown by the flow pattern in FIGS. 2 to 6 and ensures an advance of the material layer 7 settling on the pipe bottom 6 and advanced together with the particles 3 which are conveyed by the gas stream 4 in freely floating manner. Thus, depending on the characteristics of the material being conveyed, the desired conveying capacity and the length of the conveying path, all flow pattern as illustrated in FIGS. 2 to 6 are possible. Apart from preventing the occurrence of static material layers, the specific pressure drag is considerably reduced and it is possible to considerably increase the charge of the carrier gas.

Turning now to FIG. 7, there is shown a schematic illustration of one embodiment of a conveying apparatus in accordance with the present invention. The material 3 to be conveyed is supplied from a hopper 25 into a feeder 11 in form of a tank and mixed with carrier gas 4 supplied from a gaseous power source (not shown) via a suitable valve 26. It will be appreciated that the feeder 11 may be of any suitable design and may include automatic feeders, rotary feeders, locks, pressure senders etc. The material 3 is sent under pressure in the transport pipe 1 in such a manner that the material 3 does not completely fill the cross section of the transport pipe 1 but rather fills only part thereof.

Carrier gas may also be supplied into the transport pipe 1 via a further valve 37.

At its junction to the feeder 11 and at suitable locations along its way, the transport pipe 1 is provided with vibration compensators 13 such as e.g. bellow expansion joints which subdivide the transport pipe 1 in individual pipe sections generally designated by reference numeral 2.

In the nonlimiting example of FIG. 7, the transport pipe 1 includes a pipe section 16 connected to the feeder 11, a straight pipe section 19, a bend 17 with its one end connected to a straight horizontal pipe section or shank 18a and with its other end connected to a straight vertical pipe section or shank 18b which in turn is connected to a further pipe section 20 leading to a receiving hopper 22. The material stream can be introduced into the receiving hopper 22 without any special separators. The carrier gas escapes through a small filter 23 at the top of the hopper 22 as indicated by the arrow.

Except for the pipe section 20, all the pipe sections 2 are resiliently or vibratingly supported e.g. by springs and subjected to vibrations generated by respective vibrators. In the nonlimiting example of FIG. 7, the pipe section 16 is subjected to vibrations generated by an electromagnetic vibrator 14 which is controllable in order to allow variations of the amount of material to be transported or to allow transport of the material in controlled doses so as to operate as a metering element. Preferably, the vibrations generated by the vibrator 14 are directed in axial direction of the pipe section 16 or at an angle of up to 45°. The pipe section 19 is subjected to vibrations generated by a double unbalance motor 15 with vibrations directed in axial direction of the pipe section 19 or at an angle of up to 45° relative to the pipe axis while bend 17 is subjected at about its center to vibrations generated by an unbalance motor 12 with circular vibration.

The vibrations to which the individual pipe sections 2 are subjected have frequencies in the range of about 50 Hz and/or accelerations of at least 1.2 g, preferably about 1.5 g. Especially with regard to bends such as bend 17, which are subjected to the greatest frictional forces, the vibrations should be selected in the above range. This is especially true if the bends are defined by a relatively small bending radius. The amplitudes of the vibrations should be in the area of fractions of millimeters.

Thus, with the exception of the fixed, non-oscillating pipe section 20, the individual pipe sections 2 of the transport pipe 1 are subjected to specific vibrations by which the wall friction is reduced i.e. friction between the stream of carrier gas and material and the pipe wall to thereby allow increased charge of the carrier gas with material at a given conveying pressure. The material layer 7 settling on the pipe bottom 6 is advanced regardless of the flow pattern by which the material is transported and which are shown in FIGS. 2–6. The occurrence of static material layers is prevented and despite increased charge of the carrier gas with material 3, the conveying velocity by which the carrier gas and the material are sent under pressure through the transport pipe 1 can be considerably reduced without running the risk of creating clogging or blockage in the transport pipe 1. Preferably, the carrier gas 4 within the transport pipe 1 should have a velocity in the range between 0.1 and 3.0 m/s.

It will be readily recognized that the transport pipe 1 as shown in FIG. 7 is made only by way of example and thus variations are certainly within the scope of the present invention such as e.g. including more than one fixed and non-oscillating pipe section 20. Further, the pipe section 19 which is shown in FIG. 7 as straight and horizontal may extend at an angle from 0° to 90°.

If it is desired to increase the charge of the carrier gas with material 3 to be conveyed in the transport pipe 1, suitable constrictions 24 such as nozzles or baffle plates may be incorporated in order to impede the flow as shown in FIG. 8, or the gas pressure may simply be varied.

When conveying very fine grained material, it may be suitable to provide a fluidized-like flow pattern as shown in FIGS. 5 and 5a. This is attained by a fluidization unit 21 which is arranged at or close to the feeder 11 and introduces auxiliary carrier gas into the feeder 11.

When transporting fine grained particles with a particle size below 1 mm in vertical upward direction, tests have shown that the vibrations applied in accordance with the present invention have the effect of evenly distributing the solids in the transport pipe 1 and so that a careful transport of the bulk material is achieved.

In case coarse grained material should be conveyed which has a particle size above 1 mm and may be extremely susceptible to fracturing or rupturing, the transport pipe 1 can be modified in such a manner that the vertical parts of the transport pipe 1 are wound helically about a vertical axis, with the helically winding parts being set in rotating vibrations about their vertical center axis. Thus, when conveying sensitive coarse particles upwards in helically shaped vertical pipes, a flow pattern similar to the horizontal transport is attained. In this manner, segregations in form of gas bulbs are avoided during transport within the vibrating transport pipe 1.

Figure 9:
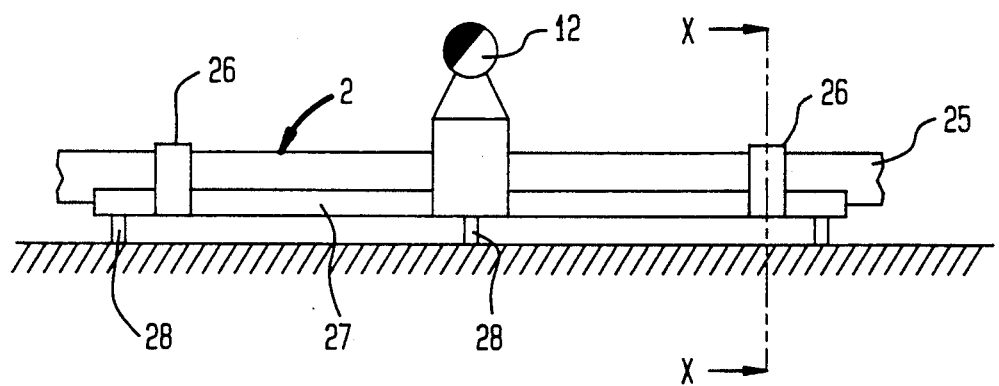
FIG. 9 is a schematic side view of another embodiment of a conveying apparatus in accordance with the present invention, illustrating a conveyor pipe section in form of a flexible hose.
Figure 10:
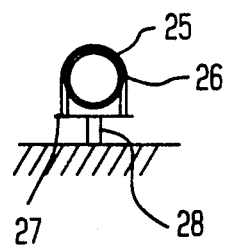
FIG. 10 is a cross sectional view of the conveyor line section taken along the line X—X in FIG. 9.

In the embodiment of the conveying apparatus as shown in FIG. 7, the individual pipe sections 2 of the transport pipe 1 are usually made in form of rigid pipes, especially of metal. Alternatively, some or all of the pipe sections 2 may also be made in form of a flexible hose as shown in FIGS. 9 and 10 and designated by reference numeral 25. The flexible hose 25 is mounted via suitably spaced hose clamps or braces 26 to a rigid U-shaped support 27 which in turn is vibratably supported via vibration absorbers 28 such as for example rubber cushions. A vibration generator such as unbalance motor 12 is mounted to the support 27 so as to indirectly subject the hose 25 to vibrations. It is, however, also feasible to directly subject the hose 25 to vibrations by placing the vibration generator 12 over the hose clamps 26 directly on the hose 25.

Although not shown in the drawing, the conveying apparatus may also include rigid pipe sections in which a flexible hose is loosely inserted. In this case the rigid pipe section is subjected to vibrations generated by a suitable vibrator.

While the invention has been illustrated and described as embodied in a method of and apparatus for pneumatically conveying material in form of granular solids, it is not intended to be limited to the details shown since various modifications and structural changes may be made without departing in any way from the spirit of the present invention.

What is claimed as new and desired to be protected by Letters Patent is set forth in the appended claims:

1. A method of pneumatically conveying material in form of granular solids; comprising the steps of:
   feeding the material under pressure with addition of a carrier gas in a transport pipe in such a manner that its cross sectional area is only partly filled with material; and
   subjecting individual pipe sections of the transport pipe independently from each other to vibrations for reducing frictional resistance between the material and the transport pipe and for forming a flow pattern in form of a strand/crown flow up to a plug flow including a flow in form of a fluidized bed, with a material layer forming at the pipe bottom being also advanced.

2. A method as defined in claim 1 wherein said subjecting step includes applying the vibrations onto the pipe sections at accelerations of at least 1.2 g.

3. A method as defined in claim 1 wherein said subjecting step includes applying the vibrations onto the pipe sections at frequencies in the range of about 50 Hz.

4. A method as defined in claim 1 wherein said subjecting step includes applying the vibrations onto the pipe sections with amplitudes in the range of fractions of millimeters.

5. A method as defined in claim 1 wherein said feeding step includes providing the carrier gas in the transport pipe at a velocity between 0.1 and 3.0 m/s.

6. A method as defined in claim 1 wherein the amount of material to be conveyed is controlled by varying the gas pressure of the carrier gas.

7. A method as defined in claim 1 wherein the amount material to be conveyed is controlled by varying the vibrations at the beginning of the transport pipe.

8. A method as defined in claim 1 wherein said subjecting step includes applying the vibrations onto pipe sections of a length of up to several meters.

9. Apparatus for pneumatically conveying material in form of granular solids; comprising
   a transport pipe;
   feeding means for introducing material to be conveyed by a carrier gas into said transport pipe;
   separating means for subdividing said transport pipe into several pipe sections, said separating means being vibration compensators;
   bearing means for resiliently supporting said pipe sections to allow vibrations thereof; and
   oscillating means connected to each of said pipe sections for individually generating vibrations of said pipe sections independently from each other.

10. Apparatus as defined in claim 9 wherein said oscillating means includes a controllable vibration generator which serves as metering element and acts upon a pipe section which is connected to said feeding means.

11. Apparatus as defined in claim 9, and further comprising constricting means arranged in at least one of said pipe sections for increasing the charge of carrier gas with material.

12. Apparatus as defined in claim 11 wherein said constricting means includes a nozzle arranged in said pipe section.

13. Apparatus as defined in claim 11 wherein said constricting means includes a baffle plate for increasing the flow resistance in said pipe section.

14. Apparatus as defined in claim 9 wherein each of said pipe sections defines an axis, said oscillating means including an electromagnetic vibrator generating vibration in axial direction of said axis.

15. Apparatus as defined in claim 9 wherein said oscillating means includes an electromagnetic vibrator generating vibration directed at an angle of up to 45°.

16. Apparatus as defined in claim 9 wherein said oscillating means includes an unbalanced motor generating a circular vibration.

17. Apparatus as defined in claim 9 wherein each of said pipe sections defines an axis, said oscillating means including a double unbalanced motor generating vibration directed in axial direction of said axis.

18. Apparatus as defined in claim 9 wherein said oscillating means includes a double unbalanced motor generating vibration directed at an angle of up to 45°.

19. Apparatus as defined in claim 9 wherein at least one of said pipe sections of said transport pipe is a bend with straight shanks, said oscillating means being a vibration generator mounted to said bend at a central location thereof.

20. Apparatus as defined in claim 9 wherein at least one of said pipe sections of said transport pipe is a straight pipe section extending at an angle of 0° to 90° relative to the horizontal.

21. Apparatus as defined in claim 9 wherein said transport pipe further includes at least one fixed, non-oscillating pipe section which has a reduced pressure drag.

22. Apparatus as defined in claim 21 wherein said fixed, non-oscillating pipe section extends in vertical direction.

23. Apparatus as defined in claim 9 wherein said feeding means are controlled in such a manner that carrier gas is intermittently supplied to create the flow pattern of an induced plug flow.

24. Apparatus as defined in claim 9, with the material being fine grained material, and further comprising fluidizing means provided at said feeding means for bringing said fine grained material into a flow pattern in form of a fluidized bed.

25. Apparatus as defined in claim 9 wherein said transport pipe includes at least one vertical pipe section wound helically about a vertical axis and subjected to rotating vibrations about its vertical center axis.

26. Apparatus as defined in claim 9 wherein at least one of said pipe sections of said transport pipe is made of a rigid pipe which is supported in vibratory manner.

27. Apparatus as defined in claim 26 wherein said pipe section is made of metal.

28. Apparatus as defined in claim 9 wherein at least one of said pipe sections is made in form of a flexible hose, and further comprising a vibratory support unit for supporting said flexible hose.

29. Apparatus as defined in claim 28 wherein said flexible hose is loosely inserted in a vibratory rigid pipe.

30. Apparatus as defined in claim 28, and further comprising fastening means for vibratably mounting said flexible hose to said support unit.

31. Apparatus as defined in claim 30 wherein said fastening means includes a hose clamp.

32. Apparatus as defined in claim 30 wherein said oscillating means is connected to said support unit.

33. Apparatus as defined in claim 30 wherein said oscillating means is directly placed via said fastening means on said flexible hose.

* * * * *

UNITED STATES PATENT AND TRADEMARK OFFICE
CERTIFICATE OF CORRECTION

PATENT NO. : 5,149,229

DATED : September 22, 1992

INVENTOR(S) : GERICKE et al

It is certified that error appears in the above-identified patent and that said Letters Patent is hereby corrected as shown below:

On cover page in section "[75] Inventors", after "Nürnberg", add -- Otto Molerus, Hemhofen, -- and change "both" to -- all --.

Signed and Sealed this

Fourteenth Day of September, 1993

Attest:

BRUCE LEHMAN

Attesting Officer

Commissioner of Patents and Trademarks